Oct. 2, 1962 W. IMHOF 3,056,712
METHOD OF WELDING PLASTICS
Filed Aug. 7, 1959 2 Sheets-Sheet 1

WALTER IMHOF, INVENTOR, DECEASED
BY WALTRAUD IMHOF, ADMINISTRATRIX
BY
John B. Brady
ATTORNEY Oct. 2, 1962 W. IMHOF 3,056,712
METHOD OF WELDING PLASTICS
Filed Aug. 7, 1959 2 Sheets-Sheet 2
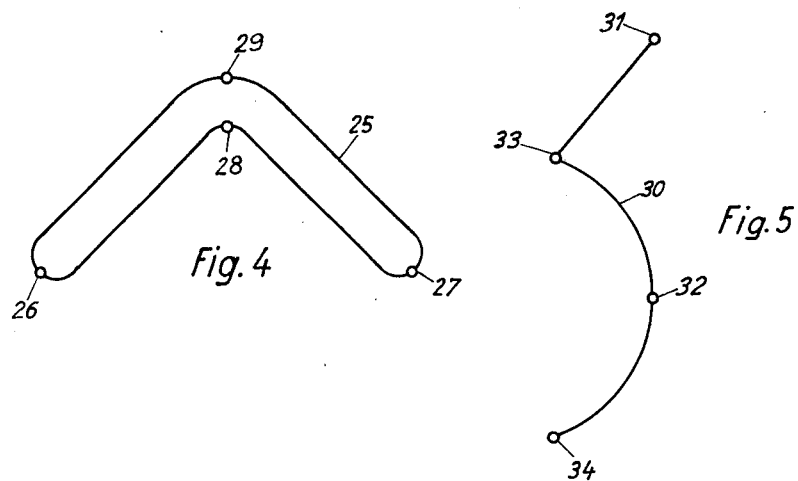
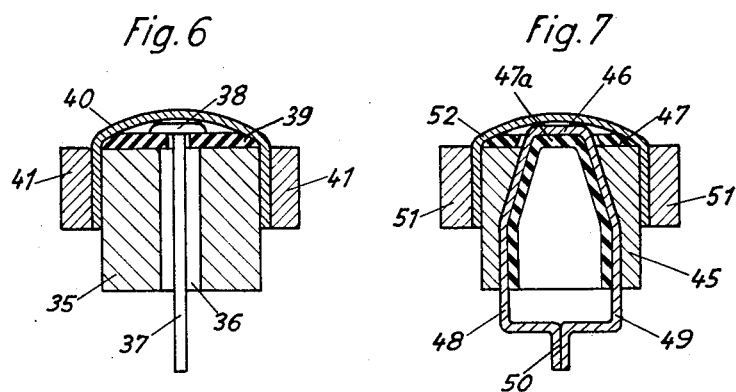
WALTER IMHOF, INVENTOR, DECEASED
BY WALTRAUD IMHOF, ADMINISTRATRIX
BY
John B. Brody
ATTORNEY United States Patent Office 3,056,712
Patented Oct. 2, 1962

3,056,712
METHOD OF WELDING PLASTICS
Walter Imhof, deceased, late of Kronberg (Taunus), Germany, by Waltraud Imhof, administratrix, Kronberg (Taunus), Germany, assignor to Firma Karl Magerle, Zurich, Switzerland
Filed Aug. 7, 1959, Ser. No. 832,395
Claims priority, application Switzerland Aug. 9, 1958
3 Claims. (Cl. 156—306)

The present invention relates to a method of welding plastics, in particular of welding plastic sheeting, along curved lines in application of the heat impulse process. The heat impulse process is a process in which a plastic material is pressed, at the spot to be welded, by members provided with an electrically heated heating conductor. The said heating conductors are heated during pressing by a short, strong impulse so that the plastic sheeting to be welded is heated to its plastic range. With these known processes it has so far been possible only to produce straight welding seams because the heating conductors must be mechanically prestressed owing to heat exchange. Nor has it so far been possible to weld closed shapes, such as circles, squares or ovals by means of an impulse because uniform heating of the two branches each absorbing one half of the current (heat conductor halves) has been practically impossible. In welding closed shapes it is, in particular, difficult to obtain perfect welding seams at the points of supply because excessive differences in heat generation occur owing to the variation in cross-section.

The method according to this invention is distinguished from the processes so far known by the fact that the heat generating electric conductor is subdivided into at least two partially overlapping circuits and that switching devices stagger the current impulses supplied to the various circuits.

An embodiment of the device for the performance of the method and various details to illustrate the method are shown in the attached drawing, in which:

FIG. 4 is a variant of an angularly arranged closed heating conductor;

FIG. 5 is a variant of an open heating conductor for the obtention of a curved welding seam;

FIG. 6 is a cross-section of a circular heating conductor with the supply from underneath to the centre, and FIG. 7 is a cross-section of a circular heating conductor with the supply from the outside and inside of the electric conductor.

Figure 1:
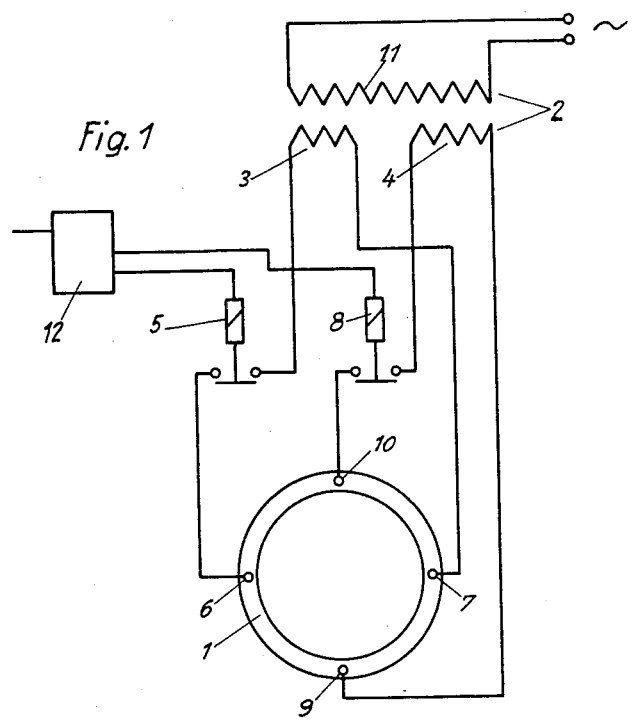
FIG. 1 is a diagram of a device for the obtention of a circular welding seam.

In FIG. 1, the reference numeral 1 designates a circular heating conductor by means of which plastic sheeting is welded together under pressure in the known manner. The numeral 2 designates a transformer provided with two secondary windings 3 and 4. The secondary winding 3 is connected to the contact points 6 and 7 of the circular heating conductor via a switching device 5, by way of example a relay. The secondary winding 4 is correspondingly connected to the contact points 9 and 10 of the heating conductor via a switching device 8. The numeral 11 designates the primary winding of the transformer 2. A switching unit 12 controls the two switch devices 5 and 8 in such a manner that the current impulses supplied to the two circuits are staggered in time. The switching unit 12 may, by way of example, be controlled from a part of the press which is not shown in FIG. 1. Again it is also possible to actuate the switching unit 12 manually by an operator.

Figure 2:
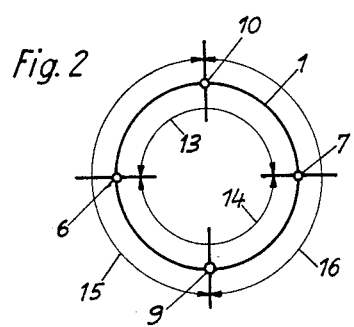
FIG. 2 is a diagram of the supply and distribution of the current impulses.

In FIG. 2 the heating conductor 1 is diagrammatically shown as a circle and the points of supply 6, 7, 9 and 10 as small circles on the circumference of the heating conductor 1. The points of supply 6 and 7 are arranged diagonally. The points of supply 9 and 10 are arranged diagonally and at an angle of 90° relative to the points 6 and 7. This arrangement produces two semi-circular conductors 13 and 14 starting from the points of supply 6 and 7. On the circular conductor 1, the two semi-circular conductors 15 and 16 are formed from the points of supply 9 and 10. The current impulses from the secondary windings 3 and 4 are distributed, in substantially equal parts, among the conductors 13 and 14 and, respectively, 15 and 16.

Figure 3:
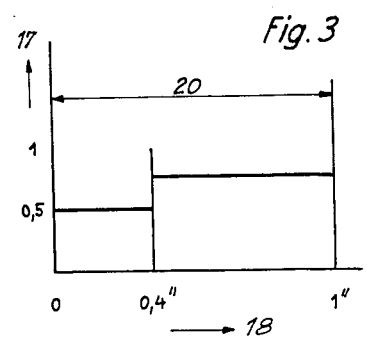
FIG. 3 is a diagrammatic view of a current impulse with a preceding stage for preheating the heating conductor.

The circuit of a device for the obtention of a circular welding seam according to FIGS. 1 and 2 may be modified or extended as desired. For 3 shows a circuit of particularly advantageous design in which current impulses are supplied to the heating conductor with a stage arranged in front for preheating the said conductor. In the diagrammatic view according to FIG. 3, the heating current is plotted in amperes in the vertical direction (arrow 17). Plotted in the horizontal direction (arrow 18) is the welding time in seconds. The example according to FIG. 3 shows that a current of .5 amp. is applied for preheating the heating conductor 1 for a period of .4 second. Subsequently to this preheating time, the full heating current with about .75 amp. is supplied. The total welding time of about 1 second is indicated by the distance 20 in the diagram.

The embodiment according to FIGS. 1 and 2 operates as follows: In a press of known design, which is not represented in the drawing, a heating conductor 1 is arranged on one of the pressure exerting members of the press. When the plastic sheeting to be welded is engaged by the press, the switching unit 12 first actuates the switching device 5 in the known manner, which connects the secondary winding 3 of the transformer 2 to the heating conductor 1 at the two diametrically opposite supply points 6 and 7. The heating current is distributed among the two halves 13 and 14 of the heating conductor in about equal proportions. The switching device 5 interrupts the current impulse supplied to the secondary winding 3 after a short time. The plastic sheeting held under the heating conductor 1 has already been slightly welded. Immediately upon interruption of the heating current from the secondary winding 3, the switching device 8 supplies current from the secondary winding 4 to the supply points 9 and 10 of the heating conductor 1. Here, too, the current is distributed substantially equally between the two semicircular parts 15 and 16 of the heating conductor 1. On the second impulse, any irregularities in the weld made by the supply points 6 and 7 are evened and corrected so that an uninterrupted and tight circular welding seam is produced. By means of such a welding seam, a circular bottom may be welded to a cylindrical container formed of plastic sheeting. Any unsatisfactory weld of the supply points 9 and 10 is corrected because the first current impulse has already formed the welding seam at these points. The switching unit 12 interrupts the second current impulse from the secondary winding 4 by means of the switching device 8, whereupon the press is again opened and the completely welded work can be removed from the press. As described above, the current impulse employed for welding may, according to the diagram in FIG. 3, be preceded by a current impulse of lesser amperage for preheating the heating conductors. The number of current impulses may be increased if this is necessary for technical reasons. The switching unit 12 is so designed that a current impulse of longer duration and smaller intensity than that employed for welding is supplied to the heating conductors for preheating.

The same process may be applied for the obtention of shaped welds in plastic sheeting. With an angularly disposed closed heating conductor 25 according to FIG. 4, the points of supply 26 and 27 are arranged at the ends of the arms of the angle. Further points of supply 28 and 29 are advantageously arranged at the centre of the angle.

The process according to this invention may also be applied to open heating conductors 30 (FIG. 5). The supply to such a heating conductor is effected via the points 31 and 32 with a first current impulse and via the points 33 and 34 with a second current impulse. It should be noted that the open ends of the heating conductor are supplied with a smaller voltage in order to avoid overheating the plastic material. With elongated open conductors, the order of impulses must be provided from the centre towards the outside so that the cooling and heat elongation of the heating conductor can operate as required.

Since the heating conductors cannot be prestressed with this method, measures must be taken to compensate for heat elongations of the heating conductor. In FIG. 6, a frame 35 is arranged as a support which exercises the pressure. A current connection 37 to the electric lead 38, which is at the same designed as a heat conductor, is introduced to the centre of the heating conductor through bores 36. The heating conductor is resiliently arranged to float on an elastic support 39. A protective covering 40 formed of heat resistant elastic material is held by clamps 41. This design is particularly recommended for heat conductors of less than 2 mm. width. For heat conductors having a width exceeding 5 mm., the current connections are advantageously designed in accordance with FIG. 7. In FIG. 7 the reference numeral 45 designates a support which at the same time serves to exercise the pressure. The heating conductor 46 is arranged so as to float on an elastic support 47 and 47a. Current connection to the heating conductor is effected from below to the outside and inside of the heating conductor by the two tongues 48 and 49. At 50 the two tongues 48 and 49 connect to form the cable connection to the secondary winding of the transformer. Clamps 51 hold a protective covering 52 formed of a heat resistant elastic material on the support 45.

The method according to the present invention enables plastic sheeting to be welded together along curved lines, by way of example along a circular line, which has previously not been possible by means of the known processes. The occurrence of cold areas where no weld can be obtained is eliminated by the present method. The resilient arrangement of the heating conductor prevents its deformation and thus a deviation of the welding seam from the line or shape desired. A further advantage of this method resides in the fact that substantially thicker heating conductors may be employed. With these cross-sections the heating conductor can be given any desired section.

Having now particularly described and ascertained the nature of said invention and in what manner the same is to be performed, what is claimed is:

1. A method of welding plastic, particularly along curved lines, comprising applying an electrical conductor against the plastic to be welded, subdividing the conductor into at least two partially overlapping circuits, applying a welding pulse of current through the first circuit and upon cessation of the pulse of current in the first circuit, applying a welding pulse of current through the second circuit.

2. A method of welding plastic, particularly along curved lines, comprising applying an electrical conductor against the plastic to be welded, subdividing the conductor into at least two partially overlapping circuits, applying a conductor preheating pulse of current through each circuit, applying a welding pulse of current through the first circuit and upon cessation of the pulse of current in the first circuit, applying a welding pulse of current through the second circuit, said preheating pulse being of lower amperage than said welding pulses.

3. The method as claimed in claim 2 in which said preheating pulse is of longer duration than said welding pulses.

References Cited in the file of this patent

UNITED STATES PATENTS

| | | |
|---|---|---|
| 1,236,090 | Kicklighter | Aug. 7, 1917 |
| 1,351,186 | Nelson | Aug. 31, 1920 |
| 2,389,360 | Guyer et al. | Nov. 20, 1945 |
| 2,438,685 | Stevens | Mar. 30, 1948 |
| 2,526,650 | Gaibel | Oct. 24, 1950 |
| 2,574,095 | Langer | Nov. 6, 1951 |
| 2,629,808 | Ulmschneider | Feb. 24, 1953 |
| 2,640,798 | Langer | June 2, 1953 |
| 2,706,165 | Korsgaard | Apr. 12, 1955 |
| 2,902,573 | Guyer | Sept. 1, 1959 |
| 2,952,578 | Carlson | Sept. 13, 1960 |

FOREIGN PATENTS

| | | |
|---|---|---|
| 163,916 | Sweden | July 8, 1958 |